July 22, 1969 — T. E. DRAPLIN ET AL — 3,456,524
REARVIEW MIRROR CONTROL ASSEMBLY
Filed June 12, 1967
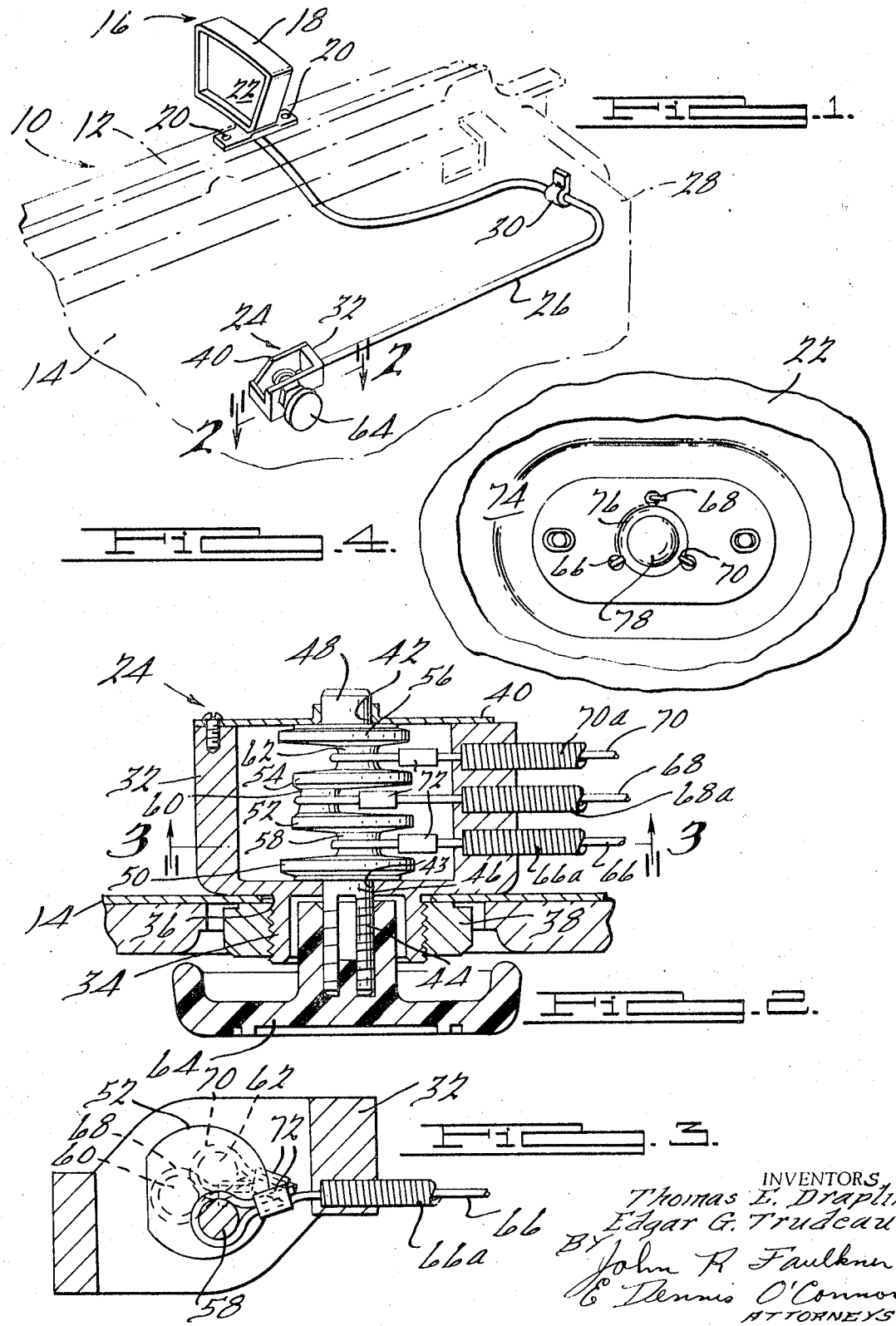
INVENTORS
Thomas E. Draplin
Edgar G. Trudeau
BY John R. Faulkner
E. Dennis O'Connor
ATTORNEYS

United States Patent Office 3,456,524
Patented July 22, 1969

3,456,524
REARVIEW MIRROR CONTROL ASSEMBLY
Thomas E. Draplin, Southfield, and Edgar G. Trudeau, Birmingham, Mich., assignors to Ford Motor Company, Dearborn, Mich., a corporation of Delaware
Filed June 12, 1967, Ser. No. 645,304
Int. Cl. F16c 1/12
U.S. Cl. 74—501                                11 Claims

ABSTRACT OF THE DISCLOSURE

A control assembly for a rearview mirror movably mounted on the exterior of a vehicle body structure. The assembly includes a rotatable crankshaft operatively supported on the body structure and having a manually operable control knob secured thereto and projecting into the vehicle passenger compartment. The crankshaft is formed with three equally spaced crankpins that are connected by Bowden wires to the mirror so that crankshaft rotation causes a following mirror movement.

Background of the invention

Recent passenger vehicle designs include the elimination of front door vent windows. Outside rearview mirror control wires, formerly routed through the door panel cavity beneath the vent windows, necessarily must be routed along the outside periphery of the door since window movement in such designs occurs throughout the entire door cavity. In order to minimize the length of wire needed, these wires may be routed around the leading edge of the vehicle door. It is known, however, that Bowden wires, conventionally used as outside rearview mirror control elements, have deleterious lost motion or "play" proportional to the number of bends in such wires. Thus, it is desirable that the orientation of the Bowden wires proximate the manually operable control means mounted on the inside door panel be substantially parallel to this panel so that a straight length of wire will reach the door leading edge, thereby reducing the number of bends in the wire and corresponding lost motion.

Also, current vehicle design practice indicates the desirability of eliminating elements having extensive protrusions of relatively small cross sections into the passenger compartment area. Manually operable control stems of rearview mirror control systems often are pivotally mounted for universal movement such that substantial protrusion into the passenger compartment of members having relatively small cross sections are necessary for simple performance of the manual task of rearview mirror adjustment.

This invention provides a rearview mirror control system of simple design and reliability of operation wherein the Bowden wires included are orientated substantially parallel to the door inner panel from their operable attachment to a manually motivated member to the door leading edge. The manually motivated member protrudes only a short distance into the passenger compartment and has a relatively large cross section including a flat surface facing the passenger compartment.

Brief summary of the invention

A rearview mirror control assembly constructed in accordance with the invention is adapted for utilization in combination with a motor vehicle body structure having an outer surface and an inner surface, the latter partially defining a vehicle passenger compartment. A mirror is operatively connected to said outer surface for pivotal movement relative thereto and is operatively connected to a mirror control device secured to said structure adjacent the body structure inner surface. The mirror control device includes a housing and a crankshaft journalled for rotation in said housing. The shaft includes more than one radially offset, angularly spaced crankpins. A plurality of control wires for transmitting the movement of said shaft to said mirror each having one of its ends secured to one of the crankpins and the other of its ends operatively secured to the shaft for rotational movement therewith, extends into the passenger compartment for manual actuation. The longitudinal axis of the crankshaft is substantially perpendicular to the inner surface of the body structure, and the control wires are orientated substantially parallel to said inner surface proximate the crankshaft.

Brief description of the drawing

FIGURE 1 is an isometric view of a portion of a motor vehicle door structure including a rearview mirror control assembly constructed in accordance with this invention;

FIGURE 2 is a sectional view taken along the line 2—2 of FIGURE 1;

FIGURE 3 is a sectional view taken along the line 3—3 of FIGURE 2; and

FIGURE 4 is a front view of the rearview mirror illustrated in FIGURE 1 having a portion of the reflective element broken away to illustrate the mirror mounting structure and control wire attachment.

Detailed description of the invention

Referring now in detail to the drawing and in particular to FIGURE 1, the numeral 10 denotes a motor vehicle door having an outer panel 12 constituting the exterior skin of the vehicle and an inner panel 14 that may be a laminar panel assembly including a sheet metal member and a soft trim member. A rearview mirror assembly 16, having a mirror housing 18 secured to outer panel 12 by fasteners 20, includes a reflective or mirror element 22 pivotally mounted on housing 18 as will be explained below in detail. A mirror control unit 24 is secured to the door adjacent the panel 14 and is operatively connected to mirror assembly 16 by a control cable 26 comprising a plurality of individual control strands or wires. The attachment of cable 26 to control unit 24 is such that the former extends from the latter to a leading edge 28 of the door in a straight line substantially parallel to inner panel 14. A clip 30 secures cable 26 to the inside surface of door leading edge 28.

FIGURES 2 and 3 illustrate the details of control unit 24 that includes a U-shaped main body 32 having an integrally formed threaded collar 34 extending therefrom through a hole 36 in door interior panel 14. Control unit 24 is secured to door inner panel 14 by the cooperation between threaded collar 34 and a nut 38. An end plate 40, having an aperture 42 therethrough, is secured across the open end of housing 32. The closed end of housing 32 has an aperture 43 formed therethrough aligned with aperture 42 in plate 40.

A crankshaft 44, having journal portions 46 and 48 journalled for rotation in apertures 43 and 42, respectively, extends through main body 32. Crankshaft 44 has formed thereon webs 50, 52, 54 and 56 that are connected by crankpins 58, 60 and 62. These crankpins are radially offset relative to the longitudinal axis of crankshaft 44 and are angularly spaced 120° apart as may be seen from FIGURE 3. A knob 64 is secured for unitary rotation with the end of crankshaft 44 that extends into the vehicle passenger compartment.

Crankpins 58, 60 and 62 have secured thereto wires 66, 68 and 70, respectively. The attachment of the wires to the crankpins is accomplished by looping the wires about the crankpin and securing the ends of the wires against the wires themselves by means of fasteners 72, as most clearly seen in FIGURE 3. Each of the wires 66, 68 and 70 is surrounded along a substantial portion of its length by wire sheaths 66a, 68a and 70a respectively, to form Bowden cables. It is to be understood that these Bowden wires are secured together by an exterior sheath to form composite control cable 26 of FIGURE 1.

FIGURE 4 illustrates the attachment of the control wires to the mirror assembly 16 as well as the pivotal mounting of reflective element 22 in said assembly. Reflective element 22 is secured for movement to a mirror backing plate 74 having a socket portion 76 formed therein that cooperates and is secured to a ball 78 formed as a part of mirror housing 18. Wires 66, 68 and 70 are secured to backing plate 74, as by brazing or some other suitable joining technique, in an angularly spaced pattern corresponding to the axial pattern of the crankpins of crankshaft 44. That is, the control wires are secured to the mirror backing plate in a circular pattern 120° apart.

Operation of the rearview mirror control system described above by the vehicle operator in order to obtain a correct rearview mirror position is accomplished simply by rotating knob 64 manually. The rotational movement of crankshaft 44, and in particular the movement of crankpins 58, 60 and 62, is transmitted via the Bowden wires to mirror reflective element 22. The rotational movement of the crank shaft is manifested as a wobbling pivotal movement of the mirror due to the particular pattern of attachment of wires 66, 68 and 70 to mirror backing plate 74.

It may be appreciated, therefore, that the rearview mirror control system of this invention allows operable connection between control unit 24 and mirror assembly 16 by means of control cable 26, such that the interior door cavity of door 10 is free to accommodate movement of the window associated with said door. Control cable 26 is oriented substantially parallel to the door inner panel 14 from control unit 24 to the door leading edge 28, thereby eliminating bends in the control cable proximate control unit 24 that would introduce unwanted lost motion in the Bowden wires included in cable 26. Manually operable knob 64 protrudes only a short distance into the vehicle passenger compartment and has a relatively large exposed cross section including a flat passenger compartment facing surface to lessen the concentration of forces during the impact of a body against knob 64.

It is to be understood that this invention is not limited to the exact construction illustrated and described above, but that various changes and modifications may be made without departing from the spirit and scope of the invention as defined by the following claims.

We claim:

1. In a motor vehicle, a body structure partially defining a vehicle passenger compartment and having an outer surface and an inner surface, a mirror operatively supported by said outer surface and capable of pivotal movement relative thereto, a mirror control device secured to said structure adjacent said inner surface and including a housing, a shaft journalled for rotation in said housing, said shaft having more than one radially offset, angularly spaced portions, a plurality of elongated control means transmitting movement of said shaft to said mirror, each of said means having one end connected to one of said shaft portions and the other end secured to said mirror, and shaft rotating means operatively secured to said shaft for movement therewith and extending into said passenger compartment for manual actuation.

2. The combination of claim 1, wherein said elongated control means comprise Bowden wires, said other ends of said wires operatively secured to said mirror in an angularly spaced relationship corresponding to the angular spacing of said shaft portions.

3. The combination of claim 1, wherein said shaft rotating means comprises a knob having a relatively flat surface facing said passenger compartment.

4. The combination of claim 1, wherein said body structure comprises a door having an outer panel and an inner panel, said shaft arranged so that the longitudinal axis thereof is substantially perpendicular to the plane of said inner panel.

5. The combination of claim 4, wherein said elongated control means extend from said crankpins substantially parallel to said inner panel for a first portion of their length and are operatively positioned along the leading edge of said door for a second portion of their length.

6. The combination of claim 1, wherein said shaft comprises a crankshaft and said radially offset angularly spaced shaft portions comprise crankpins.

7. The combination of claim 6, wherein there are three crankpins spaced 120 degrees apart about the longitudinal axis of said crankshaft.

8. In a motor vehicle, a body structure having an outer panel and an inner panel spaced from said outer panel, said inner panel partially defining a passenger compartment, movable means mounted on said outer panel and capable of movement relative thereto, control means operatively connected to said inner panel and controlling movement of said movable means, said control means including a rotatable crankshaft having its longitudinal axis substantially perpendicular to the plane of said inner panel, said crankshaft having a plurality of spaced crankpins, a rotatable operating knob operatively connected to said crankshaft and projecting into said passenger compartment, and a plurality of control wires, one end of each of said wires operatively connected to one of said crankpins, the other end of said wires operatively secured to said movable means.

9. The combination of claim 8, wherein said wires extend from said crankpins substantially parallel to said inner panel for a portion of their length.

10. The combination of claim 8, wherein said movable means comprises a rearview mirror.

11. The combination of claim 10, wherein said crankshaft includes three equally spaced crankpins, said wires attached to said mirror in a pattern corresponding to the spacing of said crankpins.

References Cited

UNITED STATES PATENTS

| | | | |
|---|---|---|---|
| 1,391,032 | 9/1921 | White | 74—501 |
| 1,499,640 | 7/1924 | Copeland. | |
| 2,933,019 | 4/1960 | Milton et al. | 74—501 |
| 2,987,962 | 6/1961 | Helka. | |

FOREIGN PATENTS 151,843   12/1931   Switzerland.

FRED C. MATTERN, Jr., Primary Examiner

CAROLYN F. GREEN, Assistant Examiner

U.S. Cl. X.R.

248—476; 350—307